Nov. 23, 1937.   F. W. WILKENING   2,099,712
METHOD OF MAKING PISTON RINGS
Original Filed Jan. 12, 1933   2 Sheets-Sheet 1
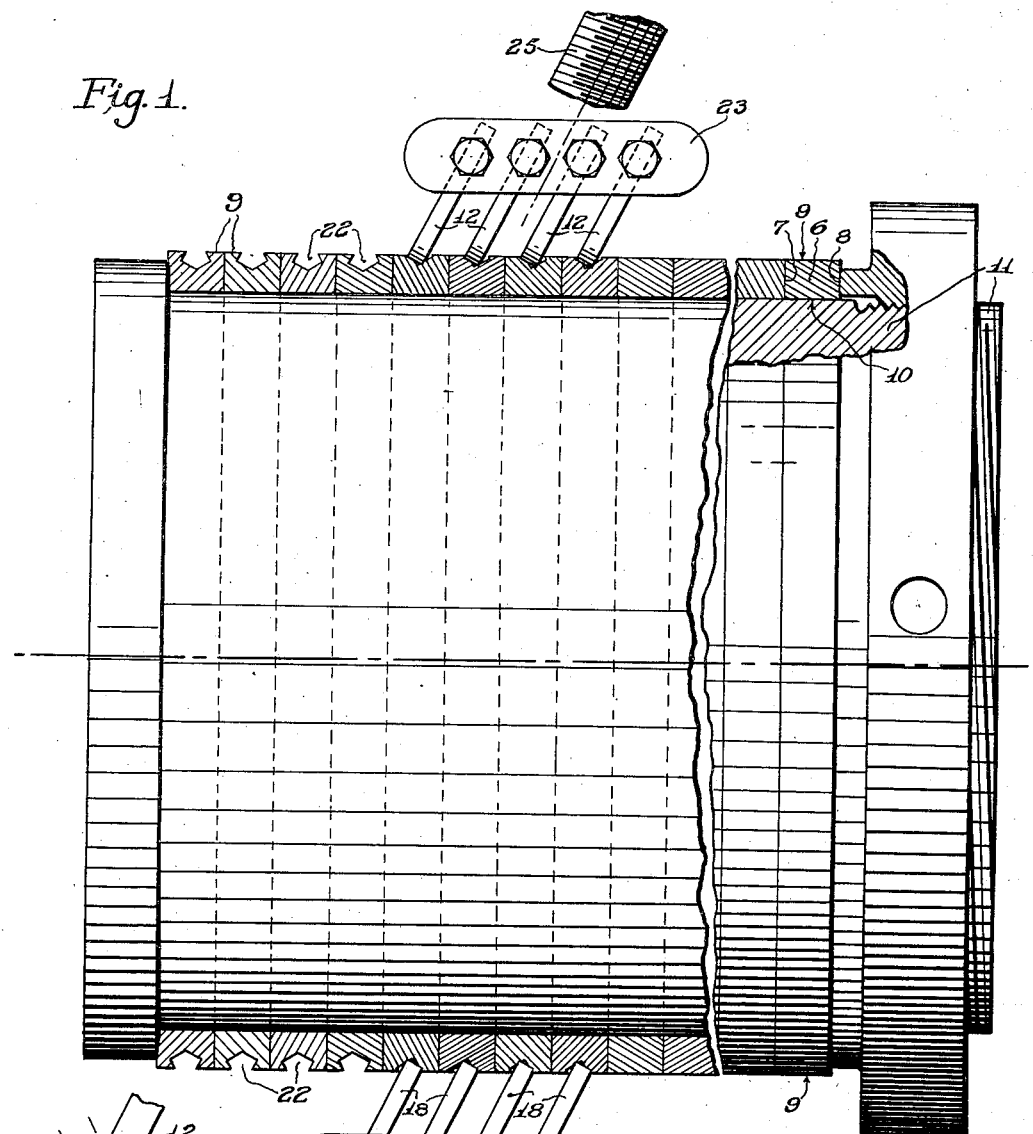
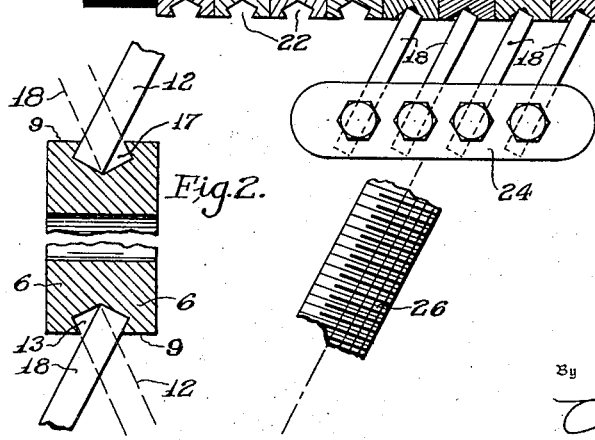
Inventor
FREDERICK W. WILKENING.
By Leonard L. Kalish
Attorney Nov. 23, 1937.  F. W. WILKENING  2,099,712
METHOD OF MAKING PISTON RINGS
Original Filed Jan. 12, 1933  2 Sheets-Sheet 2
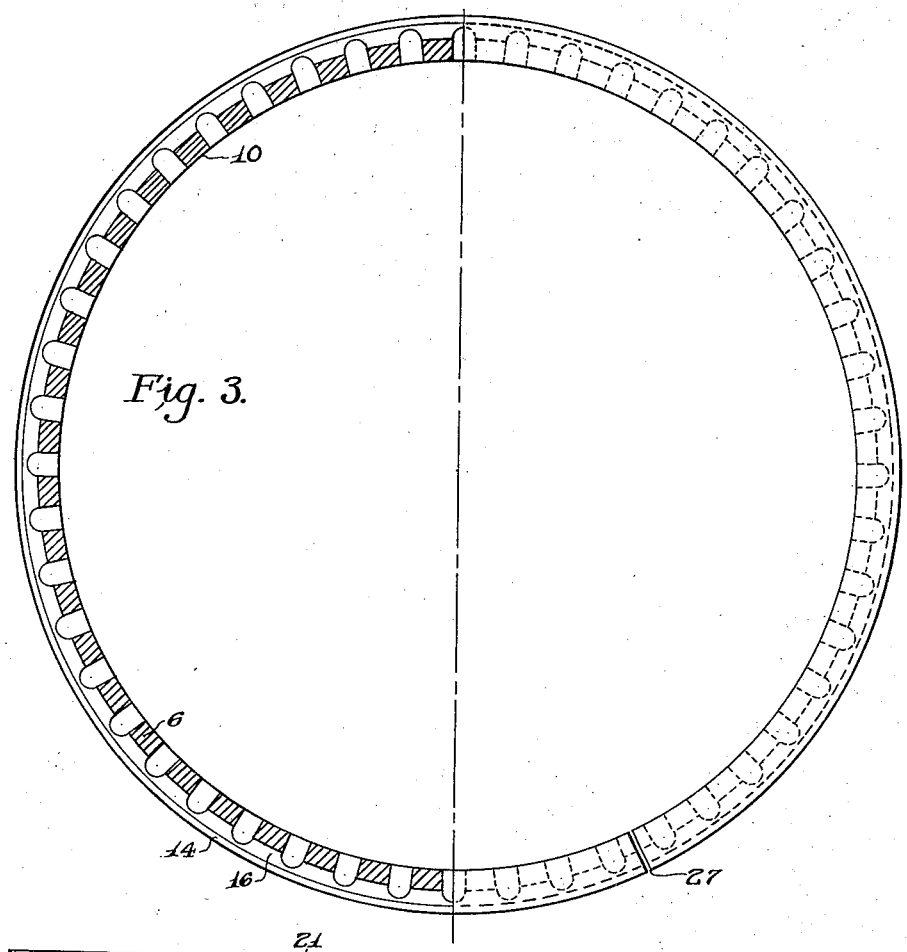
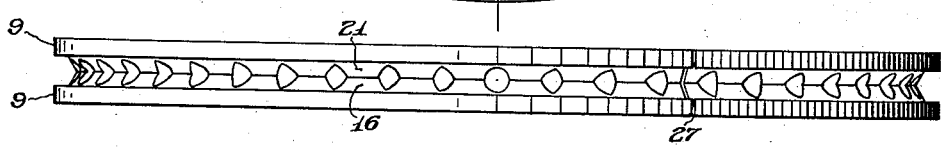
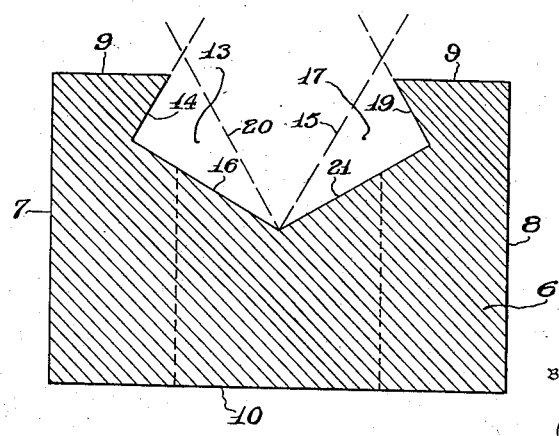
Inventor
FREDERICK W. WILKENING
By Leonard L. Kalish
Attorney Patented Nov. 23, 1937

2,099,712

UNITED STATES PATENT OFFICE 2,099,712

METHOD OF MAKING PISTON RINGS

Frederick W. Wilkening, Narberth, Pa., assignor to Wilkening Manufacturing Company, Philadelphia, Pa., a corporation of Delaware Application January 12, 1933, Serial No. 651,328
Renewed July 15, 1936

4 Claims. (Cl. 29—156.63)

The present invention relates to a new and useful method of making piston rings, and it relates more particularly to a method of making oil control piston rings.

The object of the present invention is to produce an integral piston ring having an inwardly enlarged annular channel in its outer periphery. A further object of this invention is to produce said piston ring in an efficient and facile manner and assure a uniform product.

With the above and other objects in view, the method of the present invention consists in providing generally annular metallic blank members, finishing the two opposed sides thereof to two plane parallel surfaces, at a predetermined distance apart, either by turning or by grinding, or by a combination of turning and grinding, turning the outer periphery of the ring to a cylindrical shape of predetermined diameter, then turning two parallel-side-walled and overlapping annular channels or grooves in the outer periphery of said ring, each of said parallel-side-walled channels or grooves being oppositely inclined with respect to a plane intersecting the axis of the ring at a right angle, and the inner walls of said pair of parallel-side-walled and overlapping grooves being adjacent to each other;—and then providing generally radial passageways through the thus-formed channel of said piston ring into the inner periphery of the piston ring, splitting the piston ring at one point so as to break the continuity of the annulus, and tensioning the ring so as to cause the same to exert a peripherally distributed outward radial force when in the contracted or collapsed condition, by first expanding the ring to a suitable extent, and then heating the ring while in the expanded condition to give it a "set" in said expanding condition.

The present invention further consists of other novel features which will appear more fully from the following detailed description.

For the purpose of illustrating the invention, there is shown in the accompanying drawings, one form thereof which is at present preferred, since the same has been found in practice to give satisfactory and reliable results, although it is to be understood that the various instrumentalities of which the invention consists can be variously arranged and organized and that the invention is not limited to the precise arrangement and organization of the instrumentalities as herein shown and described.

Referring to the drawings in which like reference characters indicate like parts:

Figure 1 represents a top plan view, partly in section, of a series of piston rings undergoing certain steps of the method of the present invention;—the tool elements are apparatus elements being shown diagrammatically.

Figure 2 represents a fragmentary sectional view of two diametrically opposite portions of a piston ring, as the grooving is completed.

Figure 3 represents a top plan view of a grooved piston ring.

Figure 4 represents an elevational view of the completed piston ring.

Figure 5 represents an enlarged sectional view of the finished ring.

In carrying out the present invention, annular metallic blank members 6 are provided, of cast iron or the like. The ring blanks 6 are faced on their two side surfaces 7 and 8, to plane parallel formation, either by turning or by grinding, or by a preliminary turning and a final grinding. The annular ring member 6 is then turned on its outer peripheral surface 9, to a cylindrical form, and the inner periphery 10 thereof may also be turned to a cylindrical form.

The surfacing of the sides 7 and 8, and the outer and inner peripheries 9 and 10, may be accomplished by any suitable means (not here shown) and in any usual conventional manner.

Thereafter, the ring is centered on suitable means, as for instance, the arbor or mandrel 11, and is fastened thereon, either singly or in multiple, or in "gang", as shown particularly in Figure 1, and rotated about its axis.

While thus rotated, a cutter 12, suitably aligned, is fed towards the ring 6, and gradually into the ring, thereby producing the annular channel 13, having the parallel side walls 14 and 15, and the inner or bottom wall 16, generally at an equal angle to the two side walls 14 and 15.

Simultaneously with the formation of the channel 13, a second and similar channel 17 is formed by means of a cutting tool 18;— said second channel having the side walls 19 and 20 and the inner or bottom wall 21.

As the two channels overlap each other at an angle, one side wall of each channel is removed or obliterated by the overlapping channel, thereby leaving in reality merely the two outer side walls 14 and 19, as the side walls of the ultimate channel 22, of the piston ring.

The cutting tools 12 and 18 may be operated singly or in multiple, as shown in the drawings;— being carried in any suitable tool holders 23 and 24, which are in turn supported upon suitable slidably mounted tool carriages (not shown), which are fed by any suitable conventional tool feeding means, as for instance the feed screws 25 and 26, which are shown merely diagrammatically in the drawings, to indicate the manner and direction of feeding.

When the cutters 12 and 18 have entered the desired depth, they are withdrawn.

The angle of the tool with respect to the ring may vary somewhat according to the size of the ring, but it is generally at an angle of approximately 60 degrees, more or less, as shown in the drawings.

The depth in turn is so fixed that the two inner walls 16 and 21 join each other.

Thereafter, the rings are drilled radially, as shown in Figures 3 and 4, thereby providing radial apertures through the center of the ring, divided equally on either side of the juncture line of the two bottom walls 16 and 21. The radial apertures may also be provided by milling relatively long slots in a plane at a right angle to the axis of the ring.

The rings are then split at one point 27, to permit the radial expansion thereof, and the rings are then expanded to a suitable extent and while thus expanded, are subjected to the action of heat in order to set the same in the expanded condition thereof.

Thus completed, the rings are ready for use. The final heat-shaping of the piston ring is preferably accomplished in a manner disclosed in patent to Wuerfel, 1,996,603, which eventuated from co-pending application Serial No. 415,064, filed December 18, 1929. Thus the rings are preferably supported sidewise in a plane, parallel condition, while in the expanded condition, and while subjected to heat; without however, exerting sufficient sidewise pressure to prevent the relatively free radial expansion and contraction of the ring, that is, without clamping the ring sidewise. This may be accomplished by interposing any suitable spacing member between the split ends of the rings which have been spread apart, (the spacer member serving to retain the ring in the expanded condition to a predetermined extent); and then holding the ring between flat surfaces by the weight of some suitable object. For instance, the rings can be stacked on top of each other to a suitable height on any suitable flat base plate with a common spacer member extending through the gaps of the successive rings and with a suitable flat-surfaced weight put on the top of the uppermost ring of the stack, and then subjecting the entire stack to the action of heat.

The two overlapping and oppositely inclined grooves may also be cut in succession instead of simultaneously. In the illustration in Figure 1, the cutting edge of one of two cutting tools is on top of the tool, while the cutting edge of the other cutting tool is on the bottom of the tool, so that the cutting edge of each tool is in the same direction with respect to the rotation of the rings.

The invention may be embodied in other specific forms without departing from the spirit or essential attributes thereof, and it is therefore desired that the present embodiment be considered in all respects as illustrative and not restrictive, reference being had to the appended claims rather than to the foregoing description, to indicate the scope of the invention.

Having thus described the invention, what is hereby claimed as new and desired to be secured by Letters Patent, is:—

1. The method of making piston rings which consists first facing the rings on two sides to form plane parallel side walls, then clamping the ring on its two plane parallel side walls, in turning into the outer periphery of the piston ring a pair of parallel-side-walled and overlapping annular grooves at oppositely inclined angles with respect to a plane intersecting the axis of the ring at a right angle and centrally of said parallel side walls, until the inner walls of each of said pair of grooves are adjacent to each other and each abut said plane, thereby to provide a single groove having outwardly converging side walls, drilling a series of generally round and radially disposed passageways through the piston ring, in a direction generally parallel to the aforementioned plane and symmetrically with respect thereto, with the outer ends of said passageways terminating in the channel thus formed, splitting the ring at one point so as to break the continuity thereof, and tensioning the ring by first expanding the ring to a suitable extent and then heating the ring while in the expanded condition, to set it in said condition.

2. The method of making piston rings which consists first facing the rings on two sides to form plane parallel side walls, then clamping the ring on its two plane parallel side walls, in turning into the outer periphery of the piston ring a pair of parallel-side-walled and overlapping annular grooves at oppositely inclined angles with respect to a plane intersecting the axis of the ring at a right angle and midway between said parallel side walls, until the inner walls of each of said pair of grooves are adjacent to each other and abut said plane, thereby to provide a single groove having outwardly converging side walls, and drilling a series of generally round and radially disposed passageways through the piston ring, in a direction generally parallel to the aforementioned plane with the outer ends of said passageways terminating in the channel thus formed; with said passageways divided equally on the two sides of the juncture line of the inner or bottom walls of said pair of oppositely inclined and overlapping grooves, splitting the ring at one point so as to break the continuity thereof, and tensioning the ring by first expanding the ring to a suitable extent and then heating the ring while in the expanded condition, to set it in said condition.

3. The method of making piston rings which consists in finishing the two opposed sides of an annular metallic blank, to two plane parallel surfaces at a predetermined distance from each other, clamping the ring on its two plane parallel sides, turning the outer periphery of the ring to a cylindrical shape of predetermined diameter, turning into the piston ring a pair of parallel-side-walled and overlapping annular grooves at oppositely inclined angles with respect to a plane intersecting the axis of the ring at a right angle and midway between said sides, until the inner walls of each of said pair of grooves are adjacent to each other and abut said plane, thereby to provide a single groove having outwardly converging side walls, and drilling a series of generally round and radially disposed passageways through the piston ring, in a direction generally parallel to the aforementioned plane with the outer ends of said passageways terminating in the channel thus formed; with said passageways divided equally on the two sides of the juncture line of the inner or bottom walls of said pair of oppositely inclined and overlapping grooves, splitting the ring at one point so as to break the continuity thereof, and tensioning the ring by first expanding the ring to a suitable extent and then heating the ring while in the expanded condition, to set it in said condition.

4. The method of making piston rings which consists in first finishing the opposed sides of a continuous annular metallic blank to two plane parallel surfaces at a predetermined distance from each other, to form plane parallel side walls, clamping the ring on its two plane parallel side walls, turning into the piston ring a pair of parallel-side-walled and overlapping annular grooves at oppositely inclined angles and symmetrically with respect to a median plane intersecting the axis of the ring at a right angle until the inner walls of each of said pair of grooves are adjacent to each other and inclined to each other, thereby to provide a single groove having outwardly converging side walls and outwardly diverging bottom walls, drilling a series of generally round and radially disposed passageways through the piston ring in an inward direction generally parallel to the aforementioned plane and symmetrically with respect thereto, with the outer ends of said passageways terminating in the groove previously formed, splitting the ring at one point so as to break the continuity thereof, expanding the ring to suitable extent, supporting the ring sidewise so as to prevent distortion thereof and then heating the ring while in said expanded and sidewise supported condition, to set it in said condition.

FREDERICK W. WILKENING.